US012088071B2

(12) United States Patent
Simonsohn et al.

(10) Patent No.: US 12,088,071 B2
(45) Date of Patent: Sep. 10, 2024

(54) TOOL SYSTEM FOR MOUNTING AN ELASTIC SLEEVE AND METHOD

(71) Applicant: Tyco Electronics Raychem GmbH, Ottobrunn (DE)

(72) Inventors: Thilo Simonsohn, Ottobrunn (DE); Christian Heindl, Ottobrunn (DE); Martin Hofmann, Ottobrunn (DE)

(73) Assignee: TYCO ELECTRONICS RAYCHEM GMBH, Ottobrunn (DE)

( * ) Notice: Subject to any disclaimer, the term of this patent is extended or adjusted under 35 U.S.C. 154(b) by 42 days.

(21) Appl. No.: 17/747,352

(22) Filed: May 18, 2022

(65) Prior Publication Data

US 2022/0278511 A1 Sep. 1, 2022

Related U.S. Application Data

(63) Continuation of application No. PCT/EP2020/082436, filed on Nov. 17, 2020.

(30) Foreign Application Priority Data

Nov. 22, 2019 (EP) .................................... 19210824

(51) Int. Cl.
*H02G 1/14* (2006.01)
*B25B 27/02* (2006.01)
(Continued)

(52) U.S. Cl.
CPC ............... *H02G 1/14* (2013.01); *B25B 27/02* (2013.01); *B25B 27/10* (2013.01); *H01R 43/005* (2013.01);
(Continued)

(58) Field of Classification Search
CPC .... H02G 1/14; H02G 15/1826; H01R 43/005; H01R 43/28; H01R 4/70; B25B 27/10;
(Continued)

(56) References Cited

U.S. PATENT DOCUMENTS

| 3,718,749 A | 2/1973 | Cunningham |
| 4,598,452 A * | 7/1986 | Iseki ...................... B25B 27/02 |
| | | 29/237 |

(Continued)

FOREIGN PATENT DOCUMENTS

| DE | 8705997 U1 | 6/1987 |
| EP | 2284972 B1 | 8/2013 |

(Continued)

OTHER PUBLICATIONS

International Search Report, Application No. PCT/EP2020/082436, Dated: Feb. 3, 2021, 12 pages.
(Continued)

*Primary Examiner* — Jermie E Cozart

(57) ABSTRACT

A tool system for mounting an elastic sleeve includes a holdout tube supporting the elastic sleeve prior to and during mounting, the holdout tube having a longitudinal axis, an interface element movable along the longitudinal axis and transferring pressure onto the elastic sleeve to push the elastic sleeve off the holdout tube during mounting, and an actuation lever engaging the holdout tube at a fulcrum region of the actuation lever. The actuation lever has a pair of load arms partly encompassing the holdout tube. A load region is arranged at a peripheral end of each of the load arms. The actuation lever actuates the interface element by pressing the load regions of the actuation lever against the interface element.

21 Claims, 16 Drawing Sheets

(51) Int. Cl.
  *B25B 27/10*   (2006.01)
  *H01R 43/00*   (2006.01)
  *H02G 15/18*   (2006.01)
  *B23P 11/00*   (2006.01)
  *B25B 27/00*   (2006.01)
  *B25B 27/28*   (2006.01)
  *H01R 4/70*    (2006.01)
  *H01R 43/28*   (2006.01)

(52) U.S. Cl.
  CPC ........ *H02G 15/1826* (2013.01); *B23P 11/005* (2013.01); *B25B 27/0028* (2013.01); *B25B 27/28* (2013.01); *H01R 4/70* (2013.01); *H01R 43/28* (2013.01); *Y10T 29/4987* (2015.01); *Y10T 29/53652* (2015.01); *Y10T 29/53657* (2015.01); *Y10T 29/5367* (2015.01); *Y10T 29/53896* (2015.01); *Y10T 29/53917* (2015.01); *Y10T 29/53987* (2015.01)

(58) Field of Classification Search
  CPC .... B25B 27/0028; B25B 27/28; B23P 11/005; Y10T 29/4987; Y10T 29/53652; Y10T 29/53657; Y10T 29/5367; Y10T 29/53896; Y10T 29/53917; Y10T 29/53987
  See application file for complete search history.

(56) References Cited

U.S. PATENT DOCUMENTS

| | | | |
|---|---|---|---|
| 4,893,393 A * | 1/1990 | Marshall | B29C 66/1142 29/272 |
| 5,054,821 A | 10/1991 | Hillstead | |
| 10,211,611 B2 | 2/2019 | Bier et al. | |

FOREIGN PATENT DOCUMENTS

| | | | | |
|---|---|---|---|---|
| JP | 06055463 A | * | 8/1992 | ............ B25B 27/10 |
| JP | 09200925 A1 | | 7/1997 | |
| JP | 11205939 A1 | | 7/1999 | |
| WO | 2018002516 A1 | | 1/2018 | |
| WO | 2021099330 A1 | | 5/2021 | |

OTHER PUBLICATIONS

Extended European Search Report, Application No. 19210824.9-1209, Dated: Apr. 28, 2020, 9 pages.

* cited by examiner

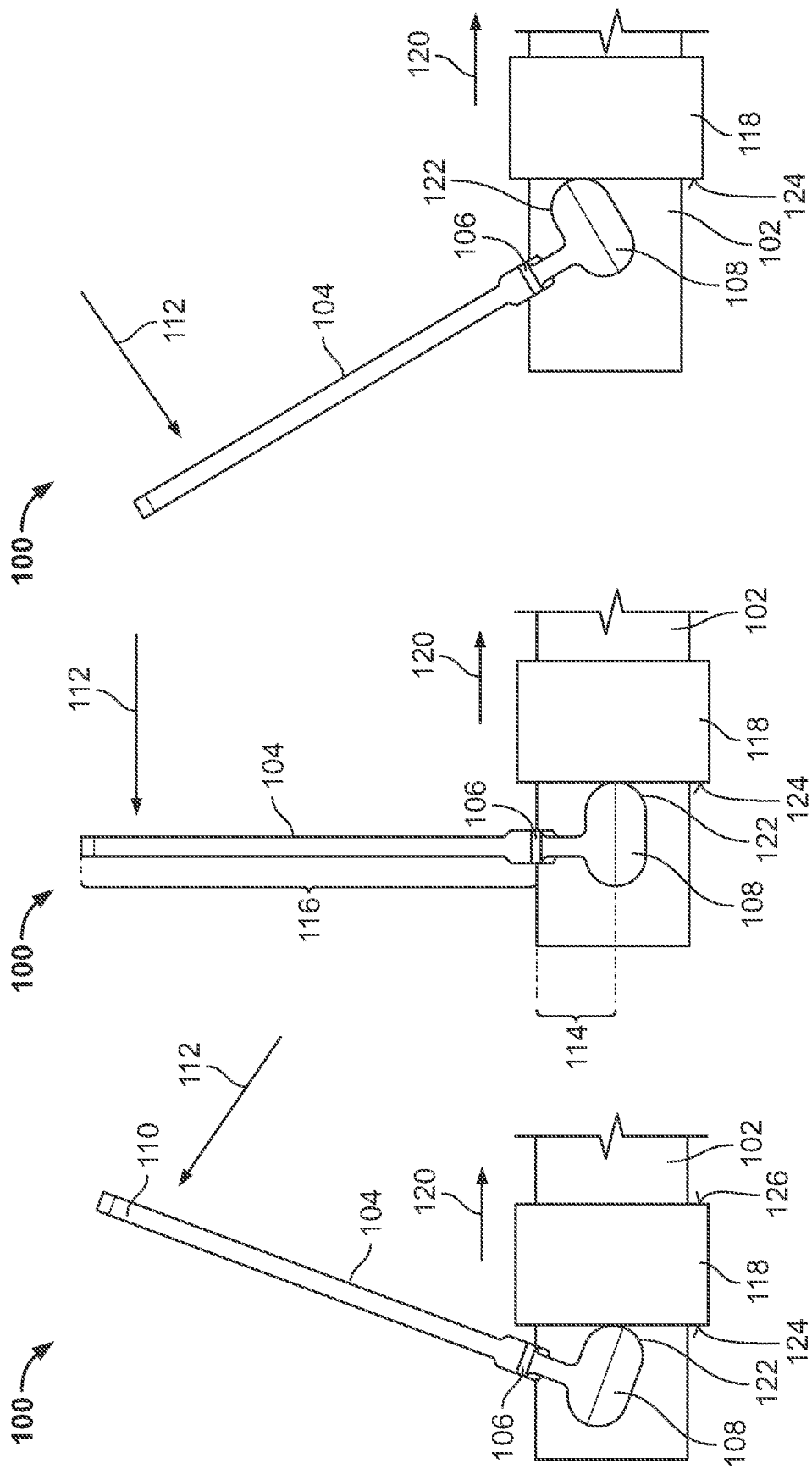

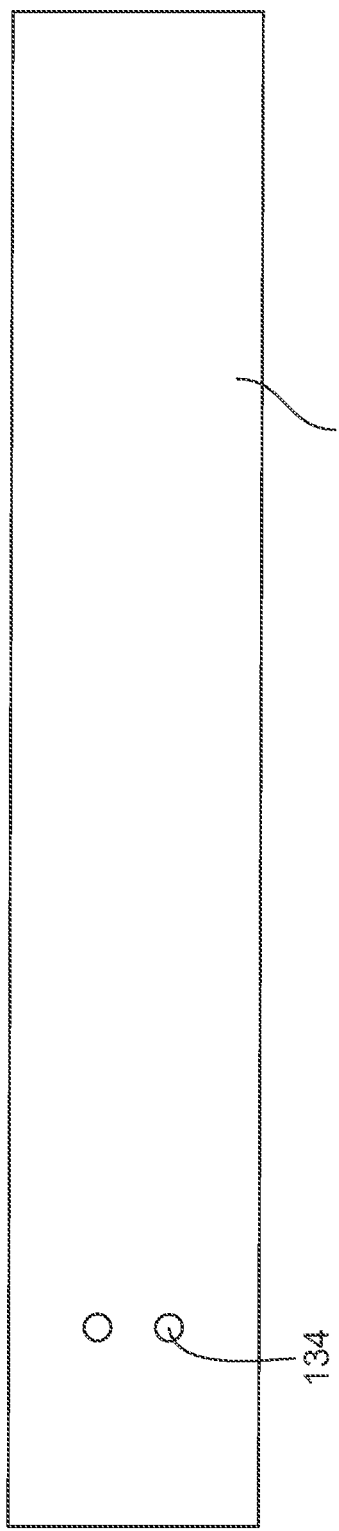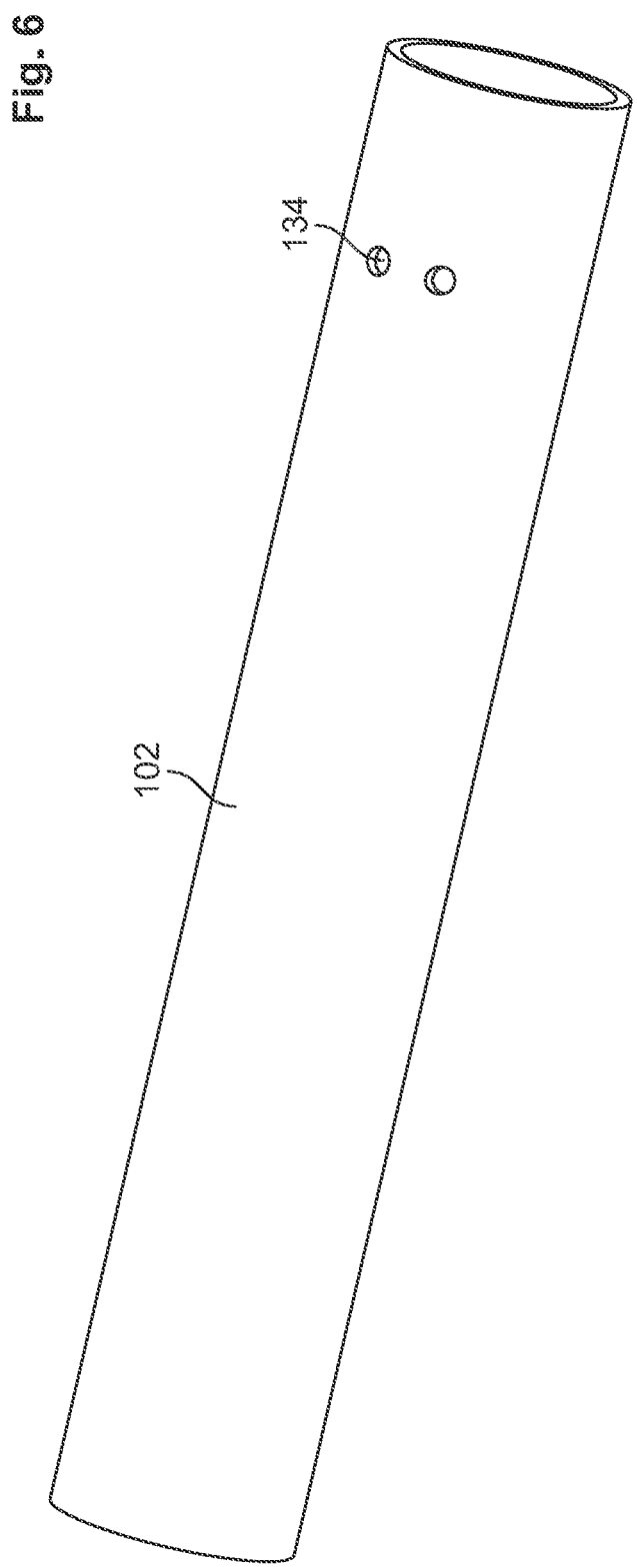

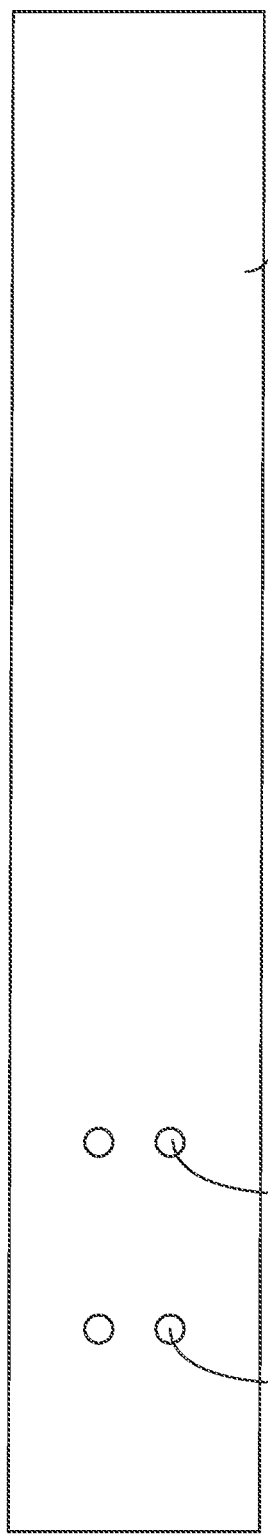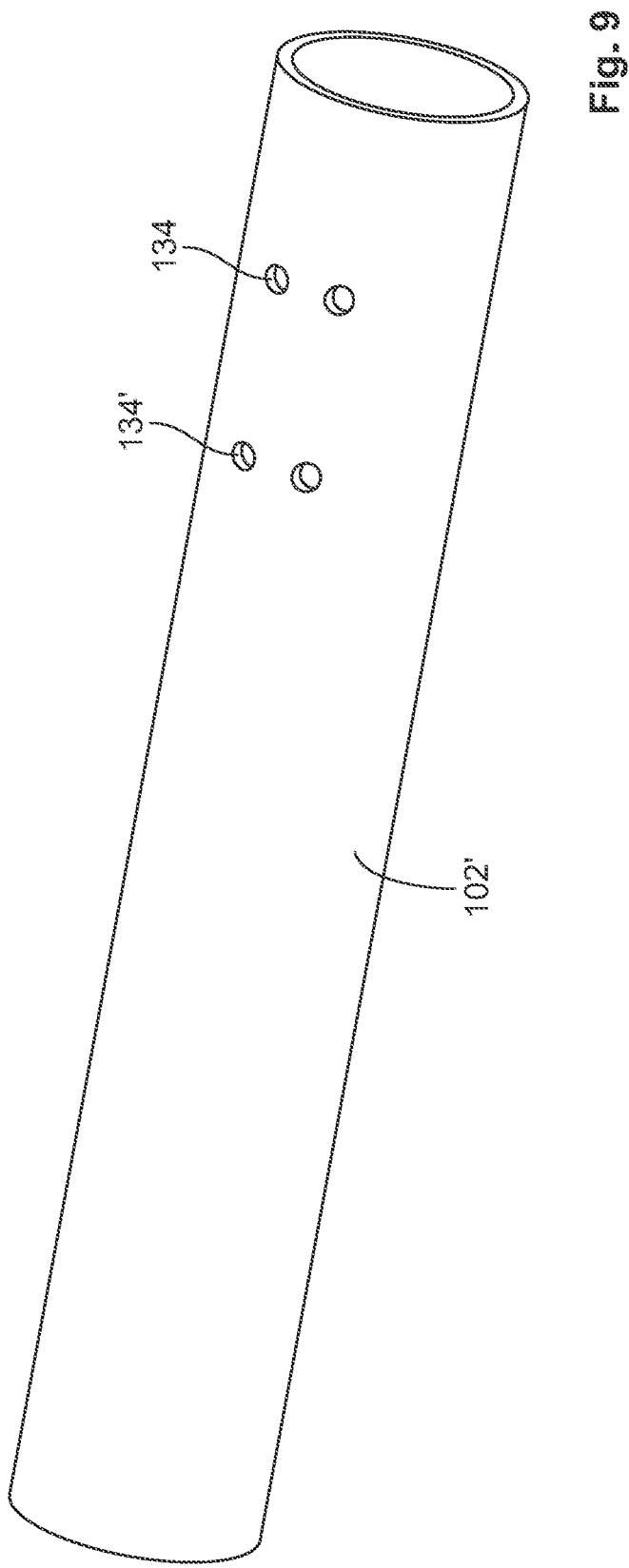

TOOL SYSTEM FOR MOUNTING AN ELASTIC SLEEVE AND METHOD

CROSS-REFERENCE TO RELATED APPLICATIONS

This application is a continuation of PCT International Application No. PCT/EP2020/082436, filed on Nov. 17, 2020, which claims priority under 35 U.S.C. § 119 to European Patent Application No. 19210824.9, filed on Nov. 22, 2019.

FIELD OF THE INVENTION

The present invention relates to a tool system for mounting an elastic sleeve and to a corresponding method for mounting an elastic sleeve.

BACKGROUND

When mounting cable connections or terminations e.g. in the field of medium voltage cabling, elastic sleeves (also called cold shrink sleeves in the following) are used for covering the electrically conductive parts of the connection or termination.

For supporting the elastic sleeve from the inside in a stretched condition during and before mounting it over the connection and/or termination, it is for instance known to use a hollow support tube formed by a plastic spiral that can be removed when the elastic sleeve must contract. However, such spiral support tubes are expensive and cause a lot of waste. The mounting procedure of spiral tubes is, in many cases, more time consuming and bears the risk of damaging the cable or pre-installed mastics.

Further, it is known to hold the elastic sleeve on an outer holdout tube which is attached to the outer surface of the sleeve in order to keep it in the expanded state. Such outer holdouts have to be destroyed or removed to allow the elastic sleeve to contract. Also, this kind of holdout tube produces a lot of waste and the expanded assembly is challenging to produce. Another option are holdouts that have a supporting tube which is covered with a pressure resistant grease. For mounting, the elastic sleeve slides on the grease.

There is still a need for an improved tool system overcoming at least some of the problems with known holdout systems, the tool system allowing an efficient assembly of an elastic sleeve, further having a high degree of safety during use, at the same time being robust and economic to manufacture. Ideally, at least a part of the involved components should be re-usable.

SUMMARY

A tool system for mounting an elastic sleeve includes a holdout tube supporting the elastic sleeve prior to and during mounting, the holdout tube having a longitudinal axis, an interface element movable along the longitudinal axis and transferring pressure onto the elastic sleeve to push the elastic sleeve off the holdout tube during mounting, and an actuation lever engaging the holdout tube at a fulcrum region of the actuation lever. The actuation lever has a pair of load arms partly encompassing the holdout tube. A load region is arranged at a peripheral end of each of the load arms. The actuation lever actuates the interface element by pressing the load regions of the actuation lever against the interface element.

BRIEF DESCRIPTION OF THE DRAWINGS

The invention will now be described by way of example with reference to the accompanying Figures, of which:

FIG. 1 is a side view of a tool system according to an embodiment in a first operational state;

FIG. 2 is a side view of the tool system of FIG. 1 in a second operational state;

FIG. 3 is a side view of the tool system of FIG. 1 in a third operational state;

FIG. 6 is a top view of a holdout tube according to an embodiment;

FIG. 7 is a perspective view of the holdout tube of FIG. 6;

FIG. 8 is a top view of a holdout tube according to another embodiment;

FIG. 9 is a perspective view of the holdout tube of FIG. 8;

DETAILED DESCRIPTION OF THE EMBODIMENT(S)

Figure 4:
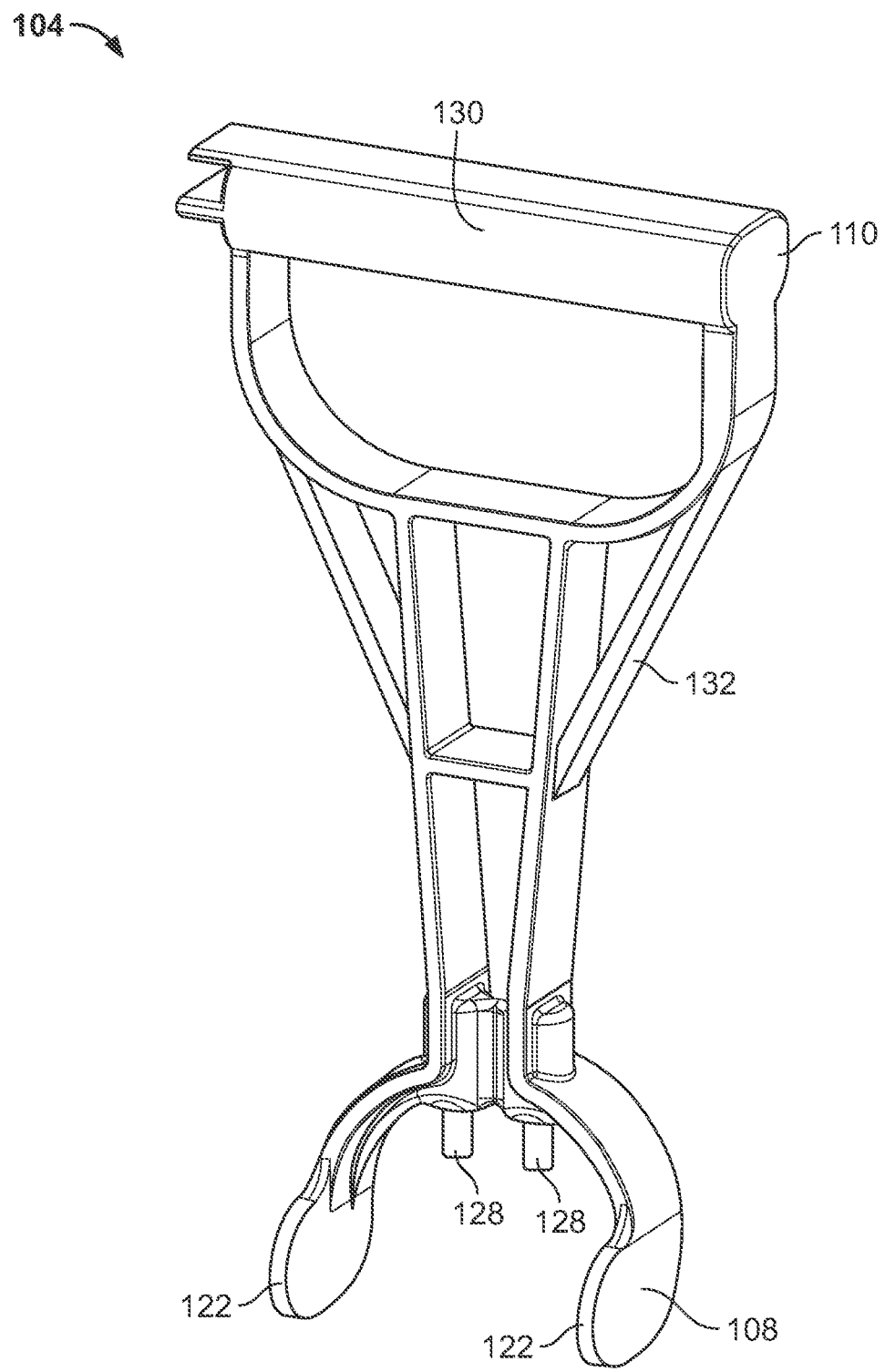
FIG. 4 is a perspective view of an actuation lever according to an embodiment.

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

The present invention will now be explained in more detail with reference to the Figures and firstly referring to FIGS. 1 to 3.

FIGS. 1 to 3 show a schematic perspective side view of a tool system 100 in three different operational stages in order to explain the working principle of the present invention. The elastic sleeve is not shown in these drawings. Further, all the drawings in the present Figures are not drawn to scale and the proportions and dimensions may, in reality, be different and may be chosen as needed.

The tool system 100 for mounting an elastic sleeve comprises a cylindrical holdout tube 102 made from a rigid plastic material on which the elastic sleeve can be mounted in an expanded state. Although not shown in the Figures, the same design features and principles apply when having a slidable film and/or grease positioned between holdout tube and elastic sleeve. The tool system 100 further comprises an actuation lever 104, which engages with the holdout tube 102 in a fulcrum region 106, as shown in FIGS. 1 to 3. As this is known for a class 1 lever, the fulcrum region 106 is located between a load region 108 that actuates the load, and an effort region 110 on which the operator exerts a force. As will become more apparent from FIG. 4, the load region 108 comprises two arms encompassing the holdout tube 102.

In order to amplify the force exerted by the operator (symbolized by the arrow 112) a load arm 114 is shorter than an effort arm 116, as shown in FIG. 2. When pressing the effort region 110 in the direction indicated by arrow 112, the load region 108 moves in the opposite direction. A transfer ratio of the effort force to the load force may for instance be 1:4.

According to the present invention, the tool system 100 further comprises an interface element 118 which comes into contact with the elastic sleeve. When the actuation element 104 is swiveled around the fulcrum region 106, the interface element is pressed in the direction indicated by arrow 120 in FIGS. 1 to 3.

Each of the two arms of the load region 108 comprises a convex curved cam element 122. The cam element 122, for instance, has an essentially circular or curved outline, so that a point of contact between the cam element 122 and the end face 124 of the interface element 118 remains close to a central longitudinal axis of the holdout tube 102. Consequently, the contact points remain essentially at equatorial positions of the cross-section of the interface element 118 and the forces exerted at the contact points act on the interface element 118 in an essentially symmetric manner (with respect to the longitudinal center axis of the holdout tube 102), so that the interface element 118 is not tilted and will not be blocked in its movement along the holdout tube 102. Further, it reduces the overall push force as the interface element 118 creates much less friction forces on the tube.

The pushing operation illustrated in FIGS. 1 to 3 starts with the actuation lever 104 being tilted towards the interface element 118 at a starting angle of about 70° with respect to the longitudinal axis of the holdout tube 102, as shown in FIG. 1. By pressing the actuation lever 104 in a direction indicated by the arrows 112, an upright position of the actuation lever (90° with respect to the longitudinal axis of the holdout tube 102, see FIG. 2) is passed and a final angle of about 120° with respect to the longitudinal axis of the holdout tube 102 is reached, as shown in FIG. 3. Due to this swiveling motion, the interface element 118 is pushed axially along the holdout tube 102 in the direction of arrow 120. The second end face 126 of the interface element 118 in use is in abutting contact with an end face of the elastic sleeve and pushes the sleeve in a direction along arrow 120 off the holdout tube 102.

In an embodiment, the interface element 118 transforms the essentially punctiform pressure exerted by the actuation lever 104 into an evenly distributed pressure that acts around the circumference of the end face of the elastic sleeve. When the sleeve is coming free from the holdout tube 102 at its end opposite to the end face that is in contact with the interface element 118, the sleeve shrinks and contracts around the component to be covered. After the gliding movement of the elastic sleeve has been initiated, the friction forces become lower, so that the pressure exerted by the actuation lever 104 does not have to be upheld for the complete distance until the holdout tube 102 is fully removed. It is often sufficient for the highest pressure to act on the elastic sleeve while the sleeve is moved to the end of the holdout tube 102 and to about 5% of the total length of the sleeve off the holdout tube 102. After that distance, the contracting sleeve itself starts pushing the holdout tube 102 from the other side, thus assisting the operation of the actuation lever 104 or making further operation of the lever 104 obsolete by creating a self-mounting process.

Figure 5:
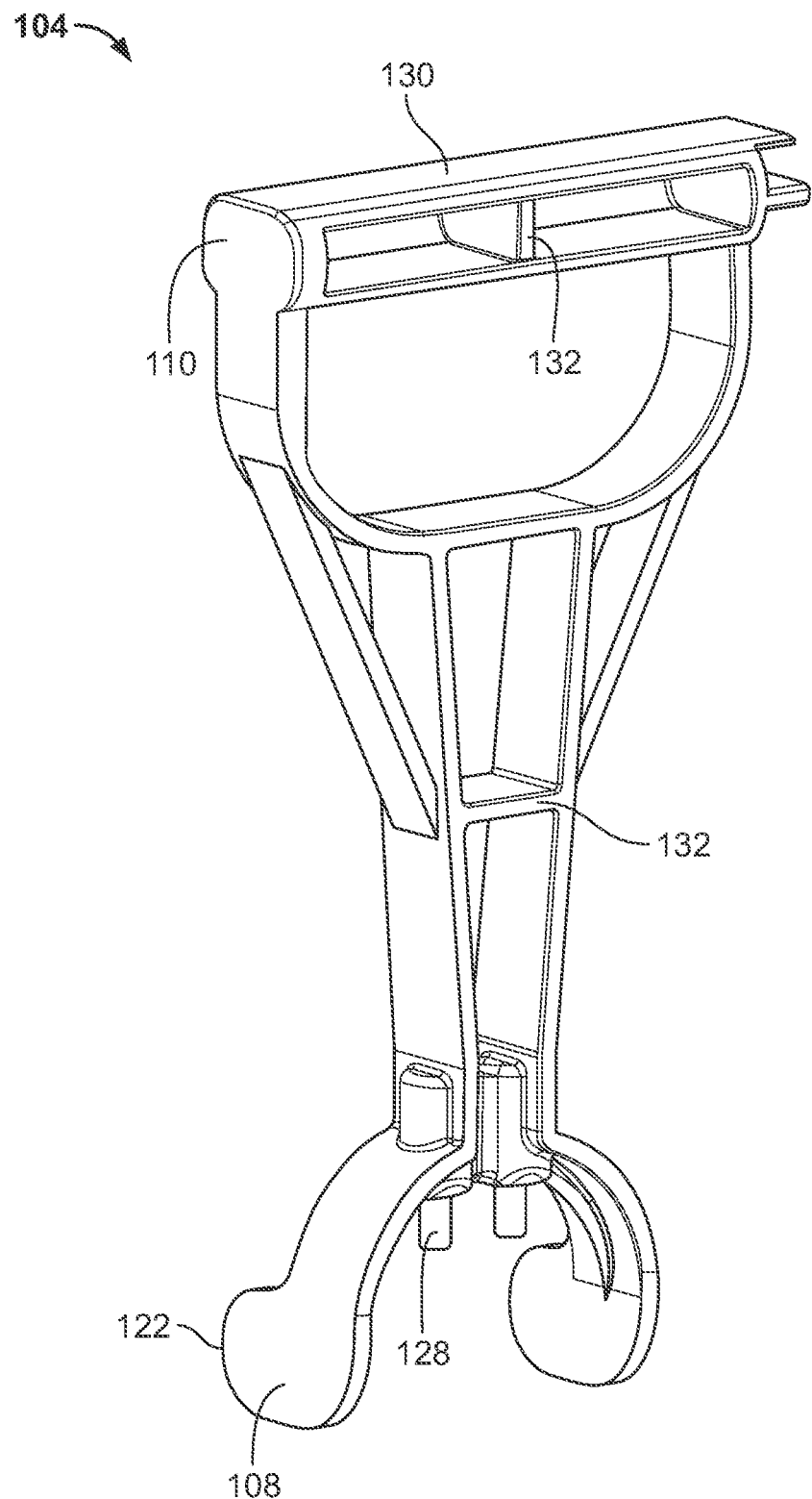
FIG. 5 is another perspective view of the actuation lever of FIG. 4.

FIG. 4 and FIG. 5 show two perspective views of an actuation lever 104 according to a first example. The actuation lever 104 may be monolithically formed as one single-piece part. The actuation lever 104 may, for instance, be manufactured from a rigid plastic material that is stiff enough to withstand the occurring bending forces. Of course, the actuation lever 104 can also be fabricated as a whole or partly from metal, such as aluminum or steel. The pins 128 may also be fabricated integrally with the actuation lever 104, using a stable material for the lever 104, such as polyamide (PA) or glass filled polypropylene (PP-GF). The holdout tube 102 is typically molded from polypropylene (PP).

According to a first example, the actuation lever 104 comprises as a fulcrum a pair of pins 128 which are formed to engage in belonging openings at the holdout tube 102. The pins 128 extend along a lever axis of the actuation lever 104. In the shown example, the pins 128 are metal bolts extending in a direction along a longitudinal axis of the actuation lever 104. It is also clear that more pins or only one pin may also be provided according to the present invention. The cross-section of the pins 128 may be round or oval or any other suitable shape.

The pins 128 are overmolded by a plastic material forming the rest of the actuation lever 104. In order to provide sufficient mechanical stability, the actuation lever 104 comprises reinforcement ribs 132 at various particularly strained portions. As there are high forces acting on the pins 128, the option of choosing metal allows to reduce their overall size. The mating openings of the holdout tube 102, which is typically made from polypropylene (PP), have essentially the same dimensions, but plastic deformation is acceptable as the openings are used only for one or parts of one mounting process, whereas the actual lever may be re-used several times. In an embodiment, the interface element 118 is re-usable and/or it has design features to ease removal such as openable interlocks or recesses which are easy to cut with standard tools.

For facilitating the operation by an operator, the actuation lever 104 has a handle 130 arranged in the effort region 110.

FIGS. 6 and 7 illustrate a cylindrical holdout tube 102 according to a first example that can be combined with the actuation lever 104 of FIGS. 4 and 5. According to this example, the holdout tube 102 has a pair of openings 134 which match in their outline to the outline of the two pins 128. In the present case, the openings 134 have the shape of circular bores. It is clear for a person skilled in the art that the openings 134 may also have any other shape suitable to function as anchor points for the pins 128. In the shown example, the number of openings 134 corresponds to the number of pins 128. This is of course not mandatory. Instead, also only one elongated opening may be provided along the circumference of the holdout tube 102. The diameter and/or shape of the openings 134 and/or the pins 128 may be chosen to increase the tiling angle i.e. by having larger openings than pins or adding significant chamfers on the inside and/or outside of the openings.

FIGS. 8 and 9 illustrate a cylindrical holdout tube 102' according to another example that can be combined with the actuation lever 104 of FIGS. 4 and 5. With only one set of openings 134 (as shown in FIGS. 6 and 7), only one stroke of the swiveling operation of the actuation lever 104 can be performed. However, the pushing distance that can be achieved thereby may not be enough. Consequently, one or more additional sets of openings 134 may be arranged along the longitudinal axis of the holdout tube 102'. The operator can therefore take the actuation lever 104 out of the first set of openings 134 after having performed a first swiveling motion and insert the actuation lever 104 into the adjacent set of openings 134'. Of course, even more than one additional set of openings 134' may also be provided.

Figure 10:
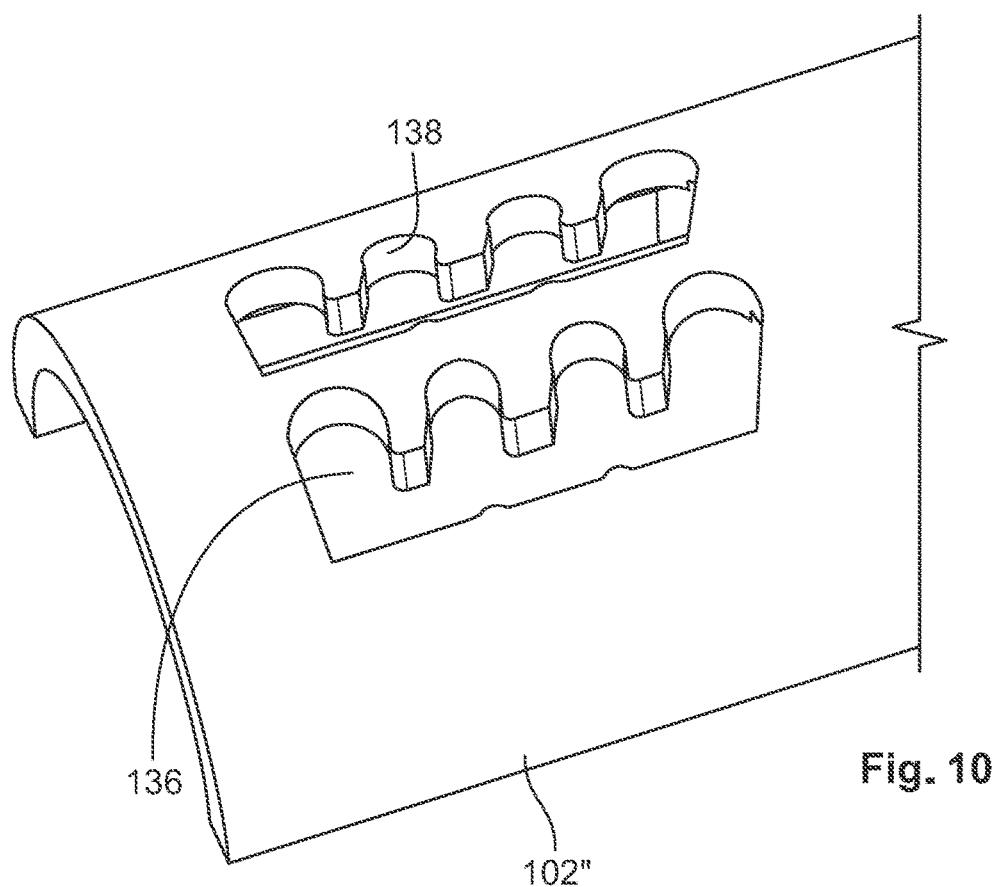
FIG. 10 is a detail perspective view of a part of a holdout tube according to another embodiment.
Figure 11:
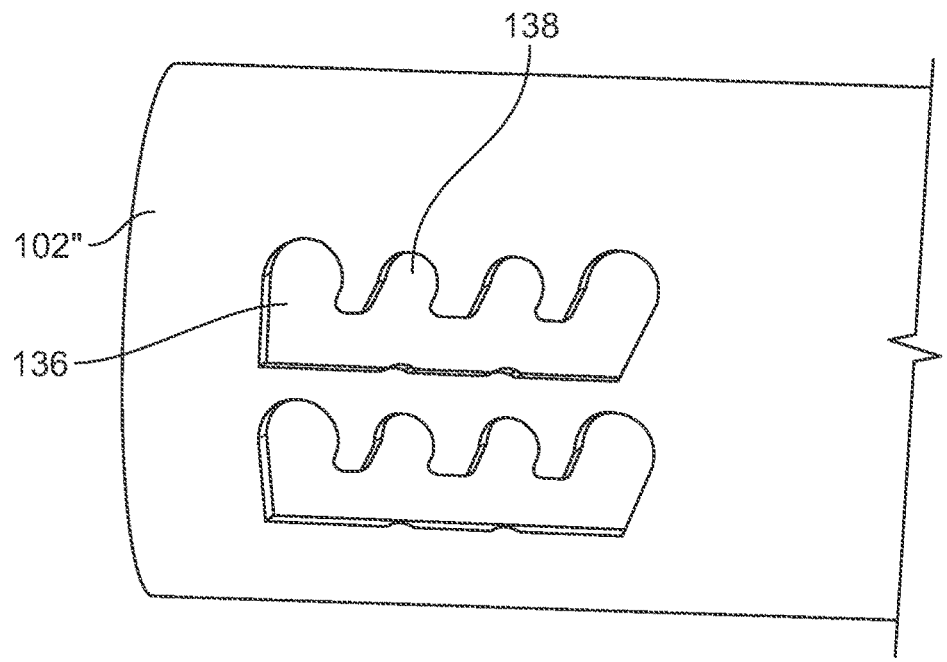
FIG. 11 is another detail perspective view of the holdout tube of FIG. 10.
Figure 12:
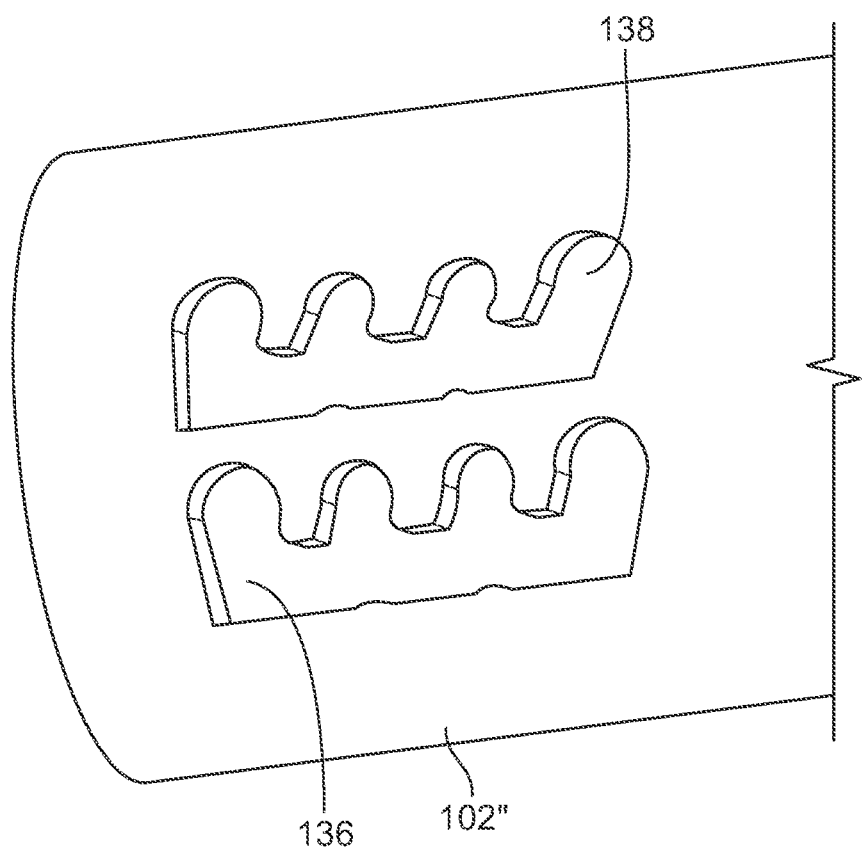
FIG. 12 is another detail perspective view of the holdout tube of FIG. 10.

Furthermore, as illustrated with the partial perspective views of FIGS. 10 to 12, instead of separate sets of openings 134, 134' according to a further example, the holdout tube 102" comprises two slotted notches 136 which function as a gate for stepwise changing the position of the fulcrum region in an axial direction. The advantage of using slotted notches 136 instead of individual openings is that the actuation lever 104 does not have to be removed completely and then re-inserted into a small opening, but has just to be shifted in a radial direction and then be pushed into the next following slot 138 by moving it first in an axial and then in a radial direction, similar to the principle of a gear shift. After the actuation lever is fixed again in the next slot 138, the swiveling motion shown in FIGS. 1 to 3 can be repeated. As shown with the example of FIGS. 10 to 12, the actuation lever 104 can take four consecutive positions. Of course, also a longer notch 136 having more than four slots 138 can also be provided.

In most applications, when having openings 134, 134' in the tube 102, it is a requirement that the elastic sleeve must not be positioned over these openings 134, 134'. Thus, the design of the interface element 118 and the actuation lever 104 must be executed such that the elastic sleeve is positioned beyond the last opening 134, 134'. One option to achieve this is to use an interface element 118 with a high width and/or an actuation lever 104 with wide and/or long load arms. According design features are employed when having anchoring elements. In this case, interface elements 118 may be slotted to be positioned at least partly in the region of the anchoring elements.

Figure 13:
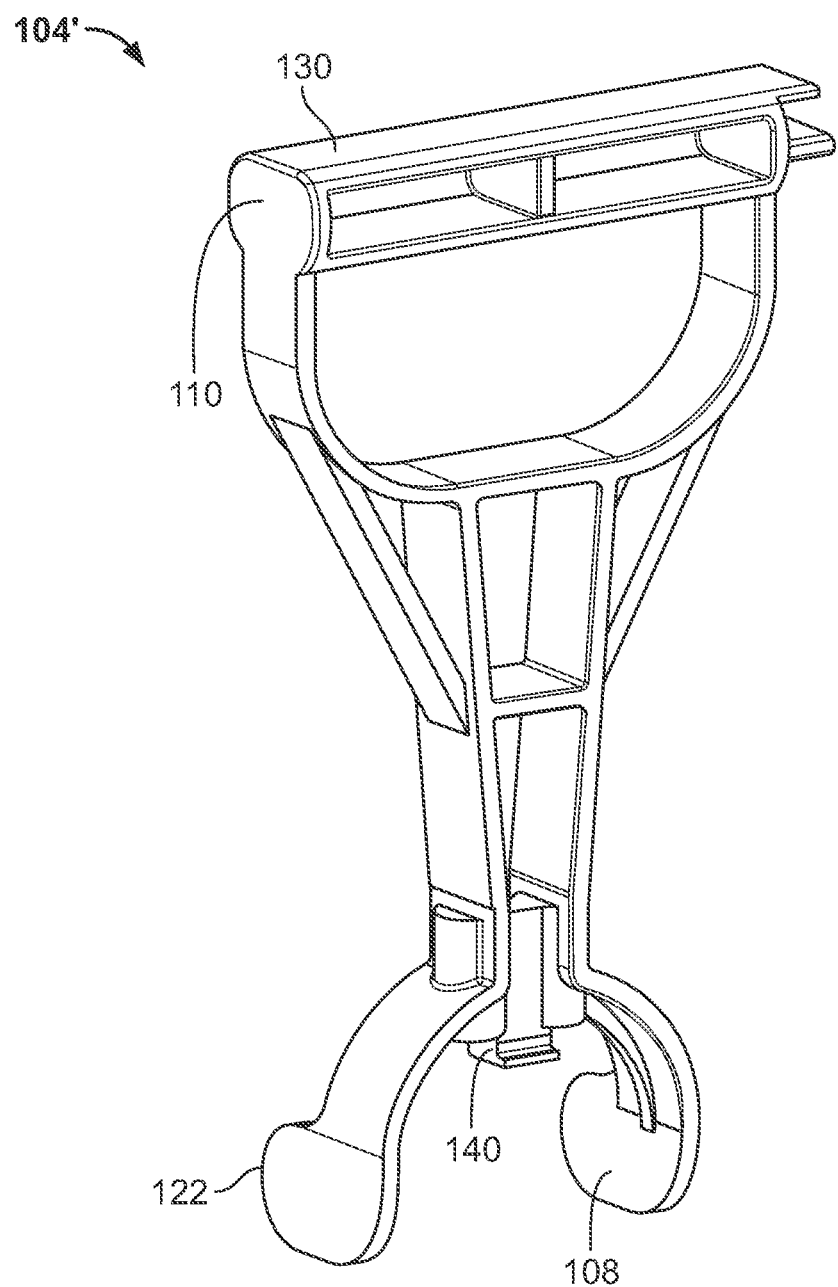
FIG. 13 is a perspective view of an actuation lever according to another embodiment.
Figure 14:
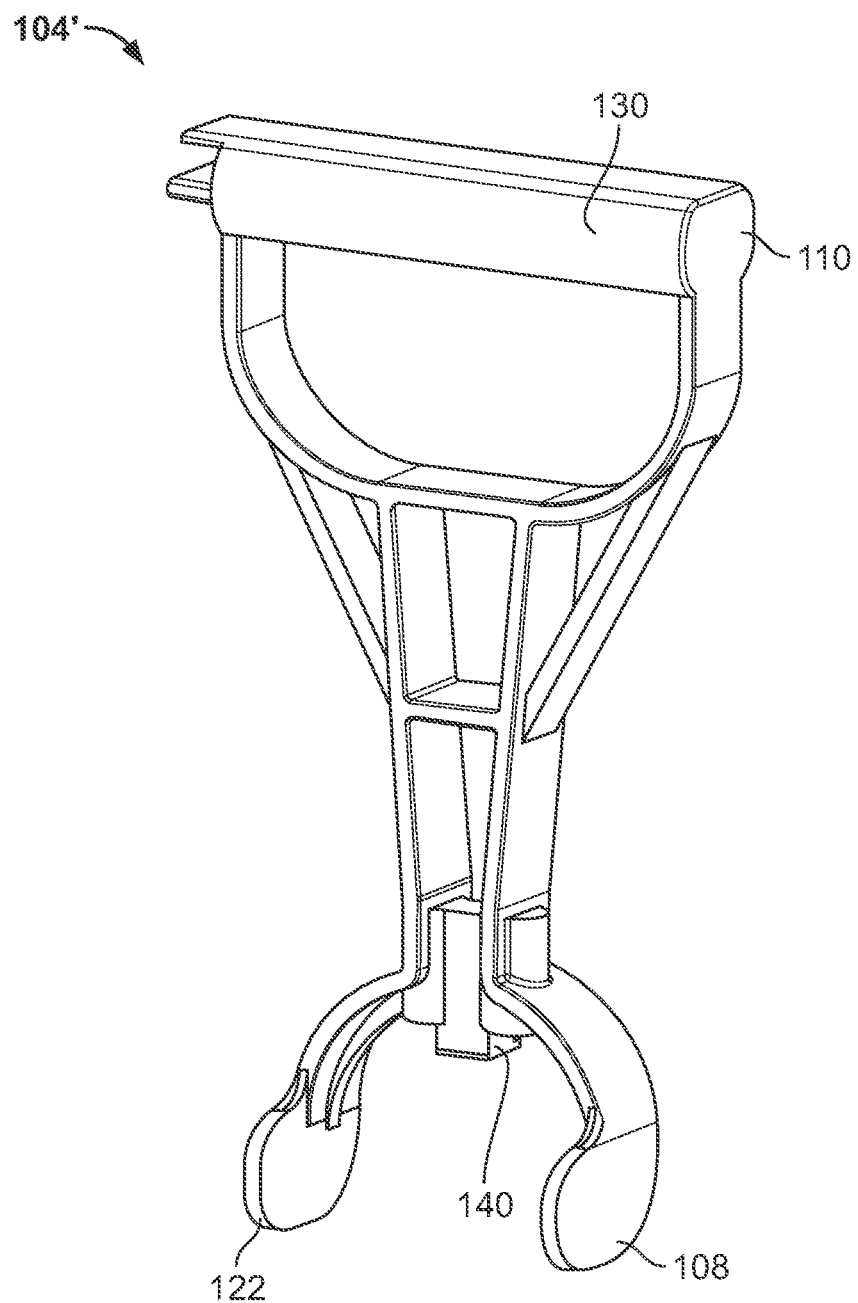
FIG. 14 is another perspective view of the actuation lever of FIG. 13.

As shown in FIGS. 13 and 14, in an embodiment, the fulcrum at the actuation lever 104' may also comprise a hook shaped fulcrum 140 instead of the pins 128. The hook shaped fulcrum 140 may engage into an elongated opening provided in the holdout tube. As compared to the example using straight pins, the hook shaped fulcrum 140 has the advantage that the actuation lever 104' can be swiveled around a larger angle. The hook shaped fulcrum 140 may be fabricated as an integral part of the actuation lever or may be formed from a different material embedded into the material forming the rest of the actuation lever. The hook shaped fulcrum means 140 may be also be made from the same material but may be manufactured as a separate piece which is assembled on site or already in the manufacturing facility.

Figure 15:
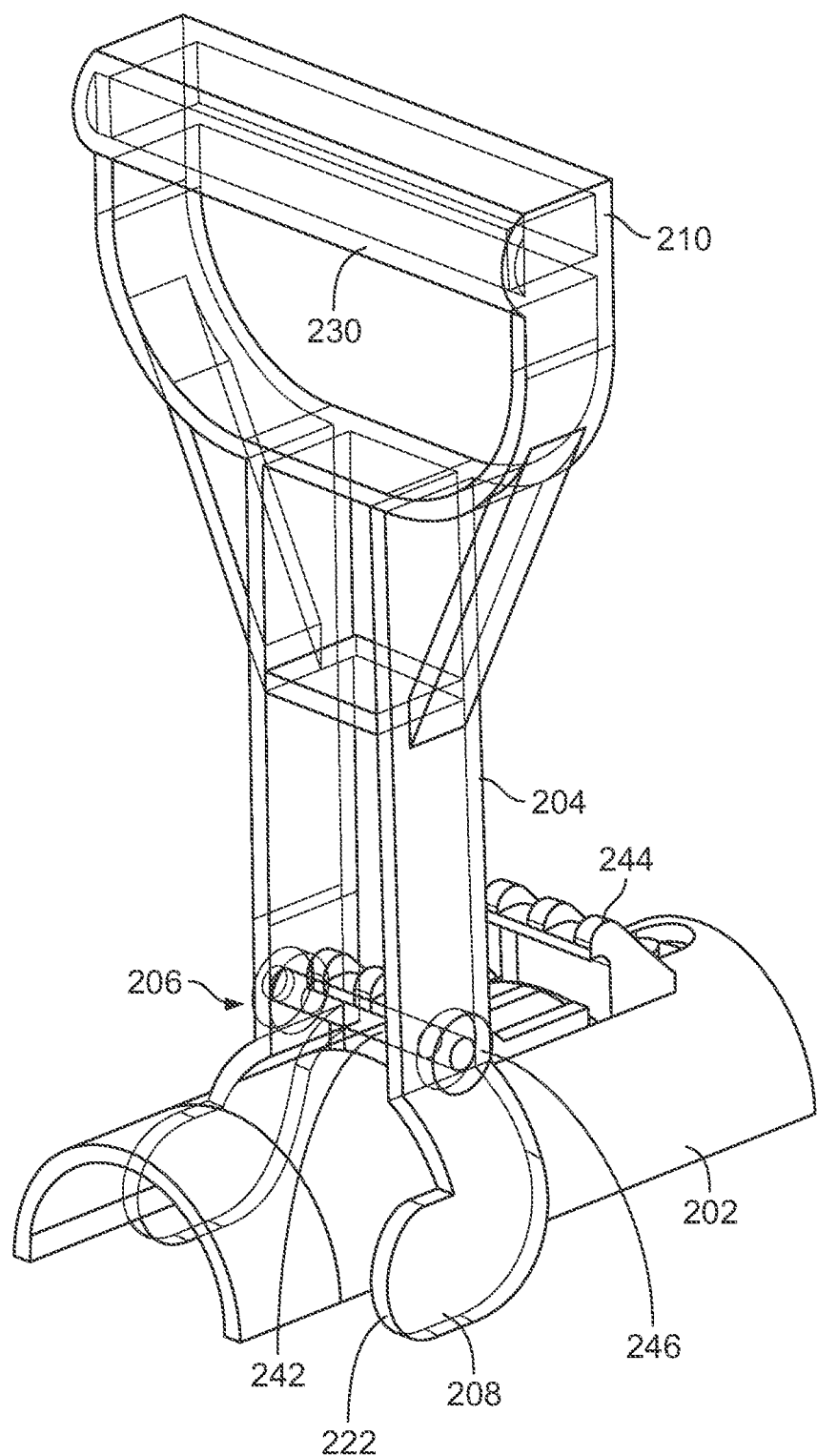
FIG. 15 is a perspective view of an actuation lever according to another embodiment with a matching holdout tube.

FIG. 15 illustrates a further advantageous example of a holdout tube 202 and an actuation lever 204, the interface element not being shown in this Figure. The functioning of the entire tool system is the same as described above with the exception that the fulcrum region 206 is designed differently. In particular, the actuation lever 204 has a pivot spindle 242 which is held rotatably in a matching bearing element 244 arranged at the outer surface of the holdout tube 202.

An advantage of the construction shown in FIG. 15 can be seen in the fact that the actuation lever 204 can be rotated around the axis defined by the pivot spindle 242 by a significantly larger swivel angle as compared, for instance, with the design using pins (see FIGS. 4 and 5). Further, the pivot spindle 242 can be fixed very stably at the actuation lever 204 for instance by screw nuts 246. For instance, the pivot spindle 242 may be fabricated from metal, such as steel. Moreover, the transmission of the force is more symmetrical than when using two pins as the fulcrum.

Figure 16:
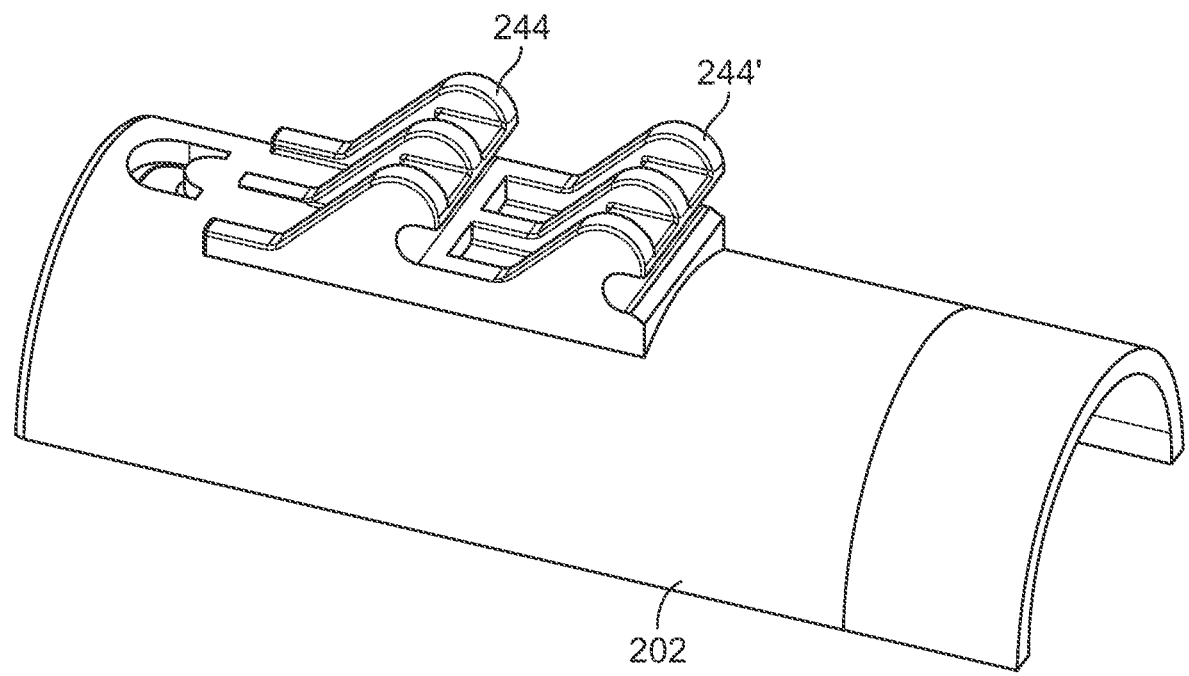
FIG. 16 is a perspective view of a holdout tube according to another embodiment.
Figure 17:
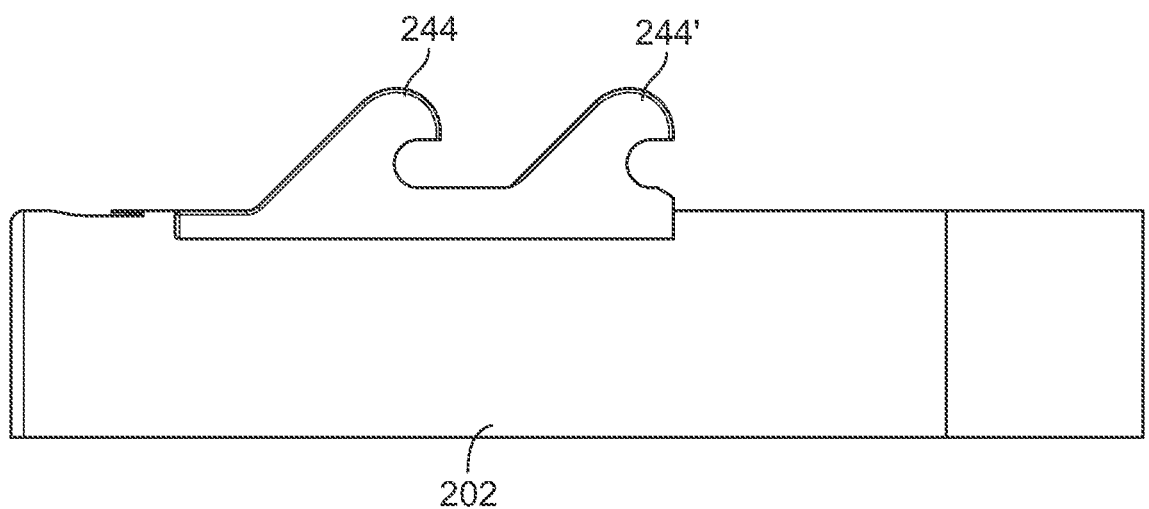
FIG. 17 is a side view of the holdout tube of FIG. 16.

As can be seen from FIG. 15 together with FIGS. 16 and 17, also more than one bearing element 244 can be provided, the second bearing element 244 being off-set in an axial direction, so that the pushing distance for mounting the elastic sleeve can be extended. When mounting the sleeve, the actuation lever 204 is first engaged with the most peripheral bearing element 244. Then, the swiveling motion of the actuation lever 204 is performed, pushing the sleeve via the interface element. Next, the actuation lever 204 is disengaged from the most peripheral bearing element 244 and engaged with the next following bearing element 244'. Then, the swiveling motion of the actuation lever 204 is performed again, pushing the sleeve further via the interface element. Of course, also more or less than the shown two bearing elements 244, 244' can be provided. However, the distance that can be covered by these two bearing elements 244, 244' has turned out to be particularly efficient.

Figure 18:
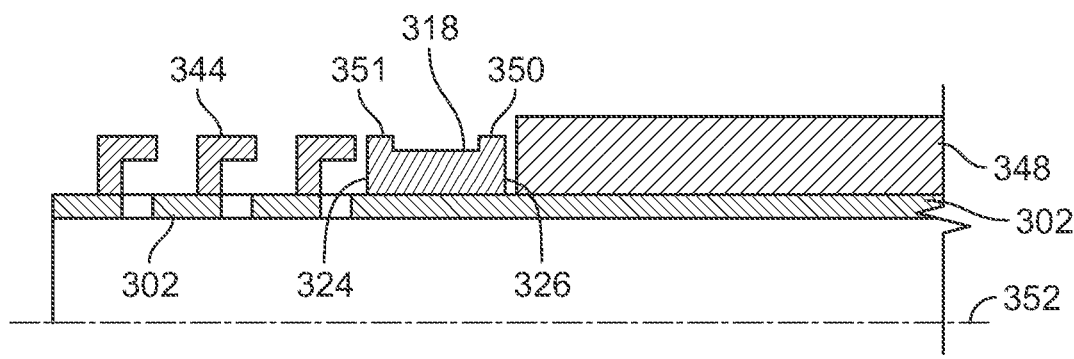
FIG. 18 is a sectional side view of a holdout tube according to another embodiment with an interface element mounted thereon.
Figure 19:
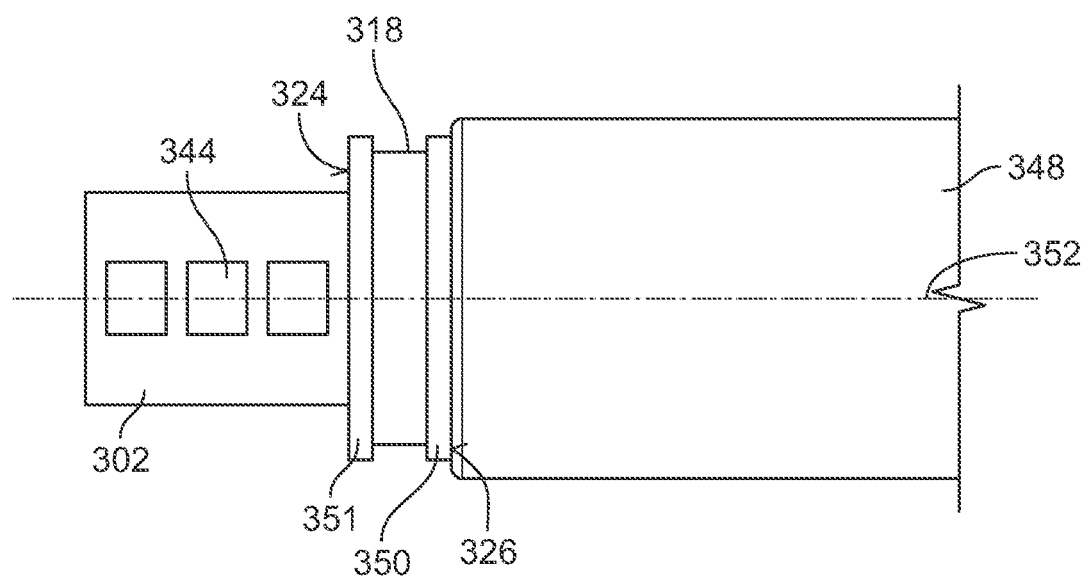
FIG. 19 is a side view of the holdout tube and the interface element of FIG. 18.

FIGS. 18 and 19 schematically illustrate an embodiment with three bearing elements 344 arranged at the holdout tube 302. Moreover, in these drawings also the interface element 318 and the elastic sleeve 348 are depicted schematically.

The interface element 318 is formed as a cylindrical slidable tube (also called push ring) with an inner diameter that is larger than the outer diameter of the holdout tube 302, wherein the slidable tube 318 has a first end face 326 which in operation comes into abutting contact with an end face of the elastic sleeve 348, and a second end face 324 which in operation is in contact with the load regions of the actuation lever.

For reinforcing the interface element 318, the slidable tube 318 has a ring-shaped force distribution flange 350, 351 at one or both of the first and second end faces 324, 326, respectively. Thus, the mechanical contact area between the interface element 318 and the sleeve 348 is enlarged, so that a particularly uniform force transmission can be achieved for smoothly moving the elastic sleeve 348 off the holdout tube 302 along the longitudinal axis 352.

Figure 20:
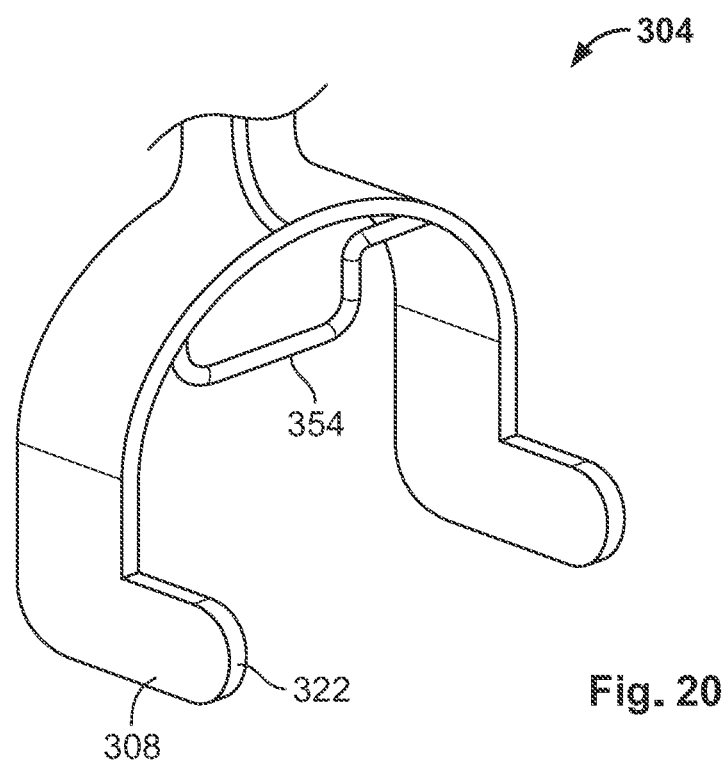
FIG. 20 is a detail perspective view of an actuation lever according to another embodiment.
Figure 21:
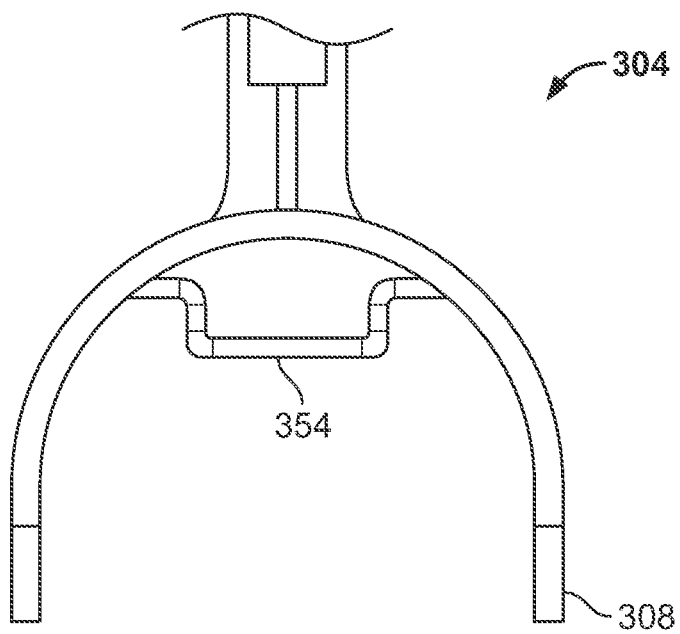
FIG. 21 is another detail perspective view of the actuation lever of FIG. 20.

In FIGS. 20 and 21, a schematic depiction of an actuation lever 304 according to a further example is shown. The actuation lever 304 may, for instance, be used together with the hook-shaped bearing elements 344 of FIGS. 18 and 19. The actuation lever 304 is essentially identical to the actuation lever 104 and 204 shown above, with the exception that the fulcrum element is formed as a wire loop 354 which could also be formed as an essentially straight bolt.

Figure 22:
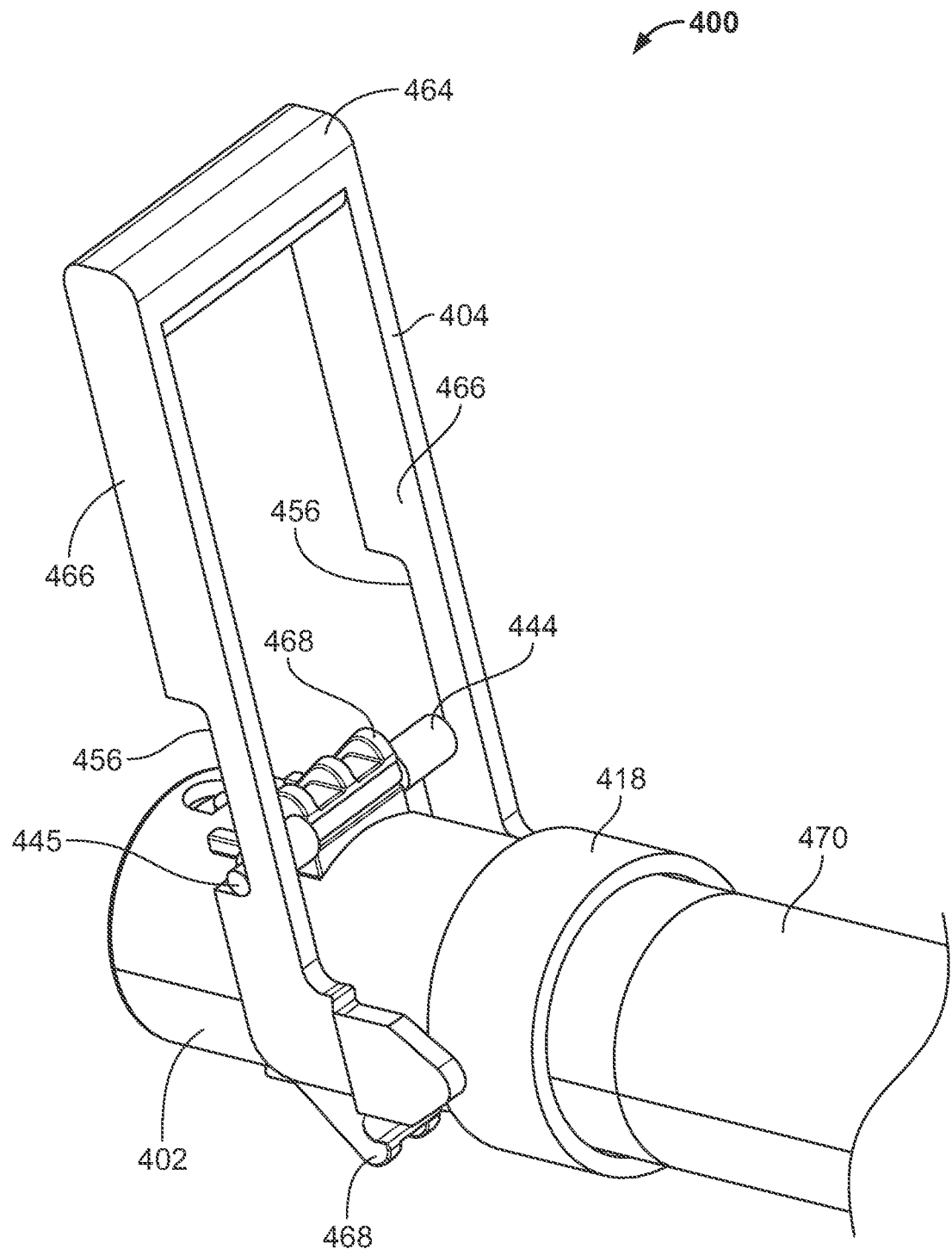
FIG. 22 is a perspective view of a tool system according to an embodiment.
Figure 23:
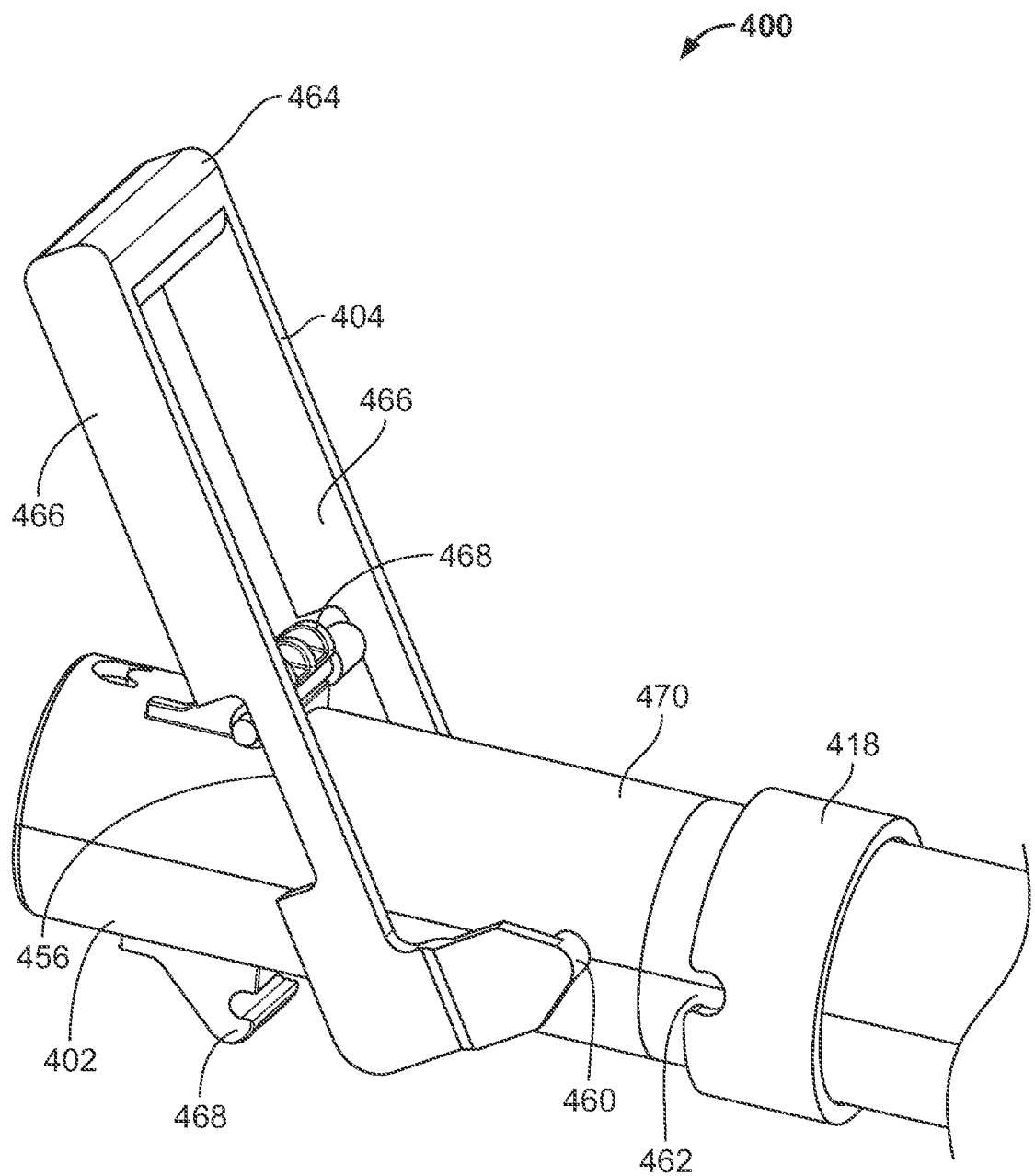
FIG. 23 is another perspective view of the tool system of FIG. 22.
Figure 24:
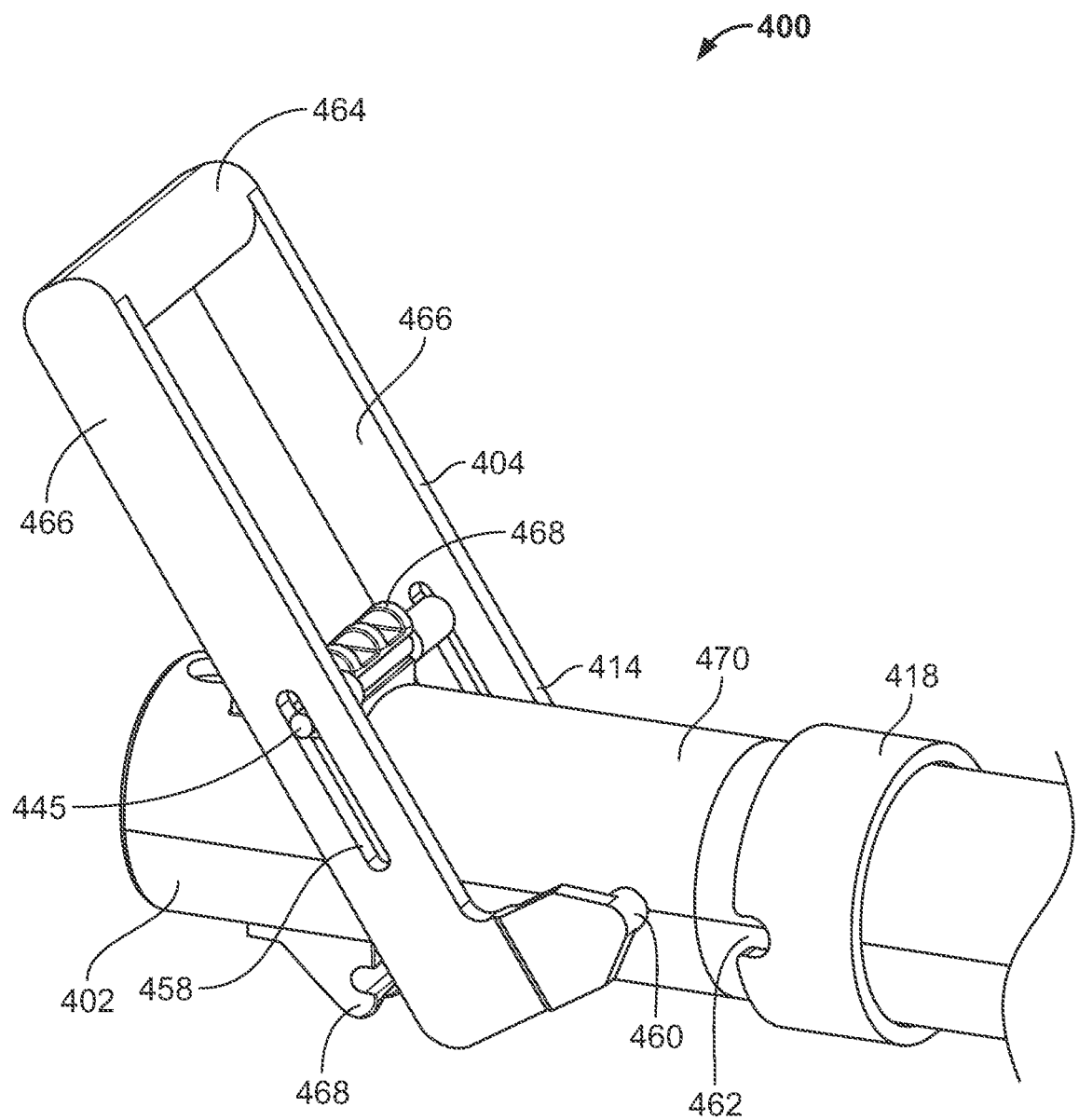
FIG. 24 is another perspective view of the tool system of FIG. 22.

FIGS. 22 to 24 show a schematic perspective view of a tool system 400 according to a further example of the present disclosure. In particular, in FIGS. 22, 23 and 24 a schematic depiction of an actuation lever 404 according to a further example is shown. The actuation lever 404 does not comprise a bearing element. In this design, a bearing element 444 is formed integral with the holdout tube 402.

The bearing element 444 may, for instance, comprise a cylindrical bolt 445 which extends across to the longitudinal axis of the actuation lever 404 and across to the longitudinal axis of the holdout tube 402. As shown in FIGS. 22 to 24, the bolt 445 is clipped in a hook-shaped support element 468 provided at the holdout tube 402. In order to provide a higher flexibility for the operator mounting the elastic sleeve, more than one such support element 468 may be arranged at the holdout tube 402 for changing the position of the bolt 445. As shown here, two support elements 468 are arranged on opposing sides of the holdout tube 402.

According to the example shown in FIGS. 22 to 24, the actuation lever 404 has an essentially U-shaped form with a base 464 and two free-cut arms 466 extending from the base 464. During the actuation move of the actuation lever 404, the bearing element 444 moves relative to the actuation lever 404 in a translational direction, whereas the lever 404 moves only in a rotational move relative to the interface element 418. In other words, according to this example, the position of the fulcrum region moves during the actuation, thereby changing the ratio between the lengths of the load arm to the effort arm. The more the actuation lever 404 is swiveled from the upright position, the shorter gets the effort arm compared to the load arm. This means that the leverage is highest at the beginning of the swiveling motion. The bearing element 444 may engage with a notch 456 arranged on the backside of each arm of the actuation lever 404 as this is shown in FIGS. 22 and 23. According to an alternative example, the peripheral ends of the bearing element 444 may be positioned inside a slot 458 on each load arm 414 of the actuation lever 404, as shown in FIG. 24.

The actuation lever 404 may have a protrusion 460, shown in FIGS. 23 and 24, that points towards the holdout tube 402 and engages with a cavity 462 provided at the interface element 418. The protrusion 460 can be rotated in the cavity 462 when the actuation lever 404 is tilted. As shown in FIG. 22, the actuation lever 404 and the interface element 418 are mounted together before the mounting of the elastic sleeve commences.

As shown in FIGS. 22 to 24, the holdout tube 402 comprises two half-shells separated in a radial direction in order to facilitate removing it after mounting. Such a multipart design may of course be used with the previously explained designs as well. Moreover, the holdout tube 402 may also comprise more than one section forming the cylindrical tube shape. Further, the holdout tube 404 may also comprise several parts which are separated in an axial direction.

In order to reduce the friction between the outer surface 470 of the holdout tube 402 and the elastic sleeve, the outer surface of the holdout tube 402 may be provided with rounded, flat, dome shaped microstructures that provide a roughening of the surface. Such microstructures may for instance be fabricated by laser-structuring or etching the mold with which the holdout tube 402 is manufactured. Further, a film or foil or a layer of grease may be arranged between holdout tube 402 and the elastic sleeve in order to reduce the friction between the two components. When using a film, it is particularly important that there is no mechanical contact between the actuation lever 404 and the outer surface 470 of the holdout tube 402 in order to avoid damaging the film. Again, such friction reducing measures are applicable to all examples of the present disclosure.

In summary, the present invention relates to elastic sleeves which are mounted by sliding or pushing off from a rigid holdout tube. The tool system also includes a lever to initiate the self-mounting of the elastomeric part which is pre-expanded onto the holdout. The lever has to be able to generate the forces required to overcome the static friction of the elastic sleeve and to move it a certain distance along the holdout tube. The push length must be large enough to allow at least parts of the joint body to start recover as it is pushed beyond the end of the holdout tube. This requires high forces and a mechanism that allows for such pushing lengths.

For instance, the lever of the pin-type concept has at least one protrusion that is engaging with the holdout tube. In an embodiment, a pair of pins is used. The cross-section of the pins may be round or it may be oval or have any other shape that generates sufficient contact area with the holdout tube. The pins may be made from metal or be integral with the lever by using a more stable material for the lever, e. g. PA or PP-GF. The holdout tube is typically molded from PP.

The zone where the pins are engaging with the holdout tube are the pivot point of the rotational move of the lever (see FIGS. 1 to 3). At the top, the jointer applies a majorly axial force of up to 150 N. Through the pivot point, this force is transformed into an axial push force at the lower end directed into the opposite direction. This force may be higher than the force applied at the top depending on design features (relative length of upper and lower part of the lever). The lower end of the lever pushes against the pre-expanded member via at least one intermediate part such as an open or closed push ring.

The lever may therefore have a rounded shape according to the tilting handle and the axial movement of the push ring.

The push ring transmits the push forces of the lever and distribute them around the circumference to some extent and to transmit them to the elastic sleeve. Applying an axial pressure which is evenly distributed around the circumference of the end face of the elastic sleeve, a smooth and uniform gliding movement of the sleeve with respect to the holdout tube can be achieved.

The sleeve may slide in direct contact with the tube or the tube may be covered with significant amounts of (pressure resistant) grease in the interface and/or a film with or without surface coatings such as silicone is arranged in the interface between the tube and the sleeve. Moreover, employing the lever principle allows an operator to introduce sufficiently high forces to overcome the friction between the expanded elastic sleeve and the holdout tube without applying extremely high manual forces which are unacceptable to some customers or may cause deformation of the cable.

The ring is also to protect the product (i.e. elastomeric sleeve) from being touched directly by the lever as well as to avoid relative movement between the product and the lower end of the lever which may cause abrasion or tear. The push ring may be designed to allow for easy removal from the cable after mounting of the elastomeric part (split part design). The holdout tube may have more than one set of engagement features for the lever. This allows to push the product in multiple cycles while engaging with different engagement features. The engagement features are spaced according to the design features of the lever.

The push ring may have a force distribution element, such as a flange, on one or both end faces. The push ring and/or the flange may further have an outline which matches a contour of the elastic sleeve. Furthermore, the push ring may be formed to comprise at least two segments. Thus, the push ring can be deformed to follow a deformation the holdout tube.

The shape of the pins and of the holes may have some design features to improve over just straight bolts and cylindrical holes to reduce the risk of disengagement of the lever and holdout tube while operating it.

A further design comprises hook-like protrusions which are built into the holdout tube. The lever has a transversally oriented element such as a metal pin to engage with the hooks. This design, in general, allows for a much larger tilting angle than providing holes and pins.

Thus, improved handling can be achieved through generating sufficient forces to initiate the axial push-off movement of the expanded member on the holdout and allowing multiple engagement positions to increase the push-off length.

The present invention further relates to a method for mounting an elastic sleeve, the method comprising the following steps: providing a holdout tube 102 for supporting the elastic sleeve prior to and during mounting, the holdout tube 102 having a longitudinal axis, and attaching the elastic sleeve in an expanded state around the holdout tube 102; mounting an interface element 118 which encompasses the holdout tube 102 at least partly and which is moveable along the longitudinal axis; providing an actuation lever 104 and engaging the actuation lever 104 with the holdout tube 102 at a fulcrum region 106 of the lever 104, wherein the actuation lever 104 comprises two load arms 114 for partly encompassing the holdout tube 102, wherein load regions 108 are arranged at a peripheral end of each of the load arms 114; pivoting the actuation lever 104 to actuate the interface element 118 by pressing the load regions 108 of the actuation lever 104 against the interface element 118, wherein the interface element 118 is moved by the actuation of the lever 104 along the longitudinal axis, so that the interface element 118 transfers pressure onto the elastic sleeve in order to push it off the holdout tube 102.

The individual steps and parts thereof may be performed in any suitable sequence. For instance, the interface element 118 may be mounted before the elastic sleeve is mounted around the holdout tube 102.

The fulcrum region 106 where the actuation lever 104 interacts with the holdout tube 102 may have various different geometries. Thus, the step of engaging the actuation lever 104 at the fulcrum region 106 may comprise: engaging at least one pin 128, which extends in a direction along the lever axis, with at least one matching opening 134 provided at the outer circumference of the holdout tube 102, or engaging at least one hook element 140 arranged in the fulcrum region 106 with at least one matching recess provided at the outer circumference of the holdout tube 102, or engaging at least one pivot spindle 242 arranged in the fulcrum region 106 with at least one matching bearing element 244 provided at the outer circumference of the holdout tube 102.

| Reference Numeral | Description |
| --- | --- |
| 100, 400 | Tool system |
| 102, 102', 102", 202, 302, 402 | Holdout tube |
| 104, 104', 204, 304, 404 | Actuation lever |
| 106, 206 | Fulcrum region |
| 108, 208 | Load region |
| 110, 210 | Effort region |
| 112 | Direction of effort force |
| 114, 414 | Load arm |
| 116 | Effort arm |
| 118, 318, 418 | Interface element, push ring |
| 120 | Direction of load force |
| 122, 222 | Cam element |
| 124 | First end face of the interface element |
| 126 | Second end face of the interface element |
| 128 | Pin |
| 130, 230 | Handle |
| 132 | Reinforcement rib |
| 134, 134' | Opening |
| 136 | Slotted notch |
| 138 | Slot |
| 140 | Hook shaped fulcrum means |
| 242 | Pivot spindle |
| 244, 344, 444 | Bearing element |
| 246 | Screw nut |
| 348 | Elastic sleeve |
| 350, 351 | Force distribution flange |
| 352 | Longitudinal axis of the holdout tube |
| 354 | Wire loop |
| 445 | Bolt |
| 456 | Notch |
| 458 | Slot |
| 460 | Protrusion |
| 462 | Cavity |
| 464 | Base |
| 466 | Free cut arm |
| 468 | Support element |
| 470 | Outer surface |

What is claimed is:

1. A tool system for mounting an elastic sleeve, comprising:
    a holdout tube supporting the elastic sleeve prior to and during mounting, the holdout tube having a longitudinal axis;
    an interface element movable along the longitudinal axis and transferring pressure onto the elastic sleeve to push the elastic sleeve off the holdout tube during mounting; and
    an actuation lever engaging the holdout tube at a fulcrum region of the actuation lever, the actuation lever has a pair of load arms partly encompassing the holdout tube, a load region is arranged at a peripheral end of each of the load arms, the fulcrum region is located between the load regions and an effort region of the actuation lever, the actuation lever actuates the interface element by pressing the load regions of the actuation lever against the interface element.

2. The tool system of claim 1, wherein each of the load regions engages the interface element at an equatorial position of the holdout tube.

3. The tool system of claim 1, wherein each of the load regions has a cam element with a curved outline keeping the actuation lever in contact with the interface element at a constant contact point during a swiveling motion of the actuation lever.

4. The tool system of claim 1, wherein the actuation lever has a lever axis and a pin arranged in the fulcrum region.

5. The tool system of claim 4, wherein the pin extends in a direction along the lever axis and engages a matching opening at an outer circumference of the holdout tube.

6. The tool system of claim 1, wherein the actuation lever has a hook element arranged in the fulcrum region.

7. The tool system of claim 6, wherein the hook element engages a matching recess at an outer circumference of the holdout tube.

8. The tool system of claim 1, wherein the actuation lever has a pivot spindle arranged in the fulcrum region.

9. The tool system of claim 8, wherein the pivot spindle engages a matching bearing element at an outer circumference of the holdout tube.

10. The tool system of claim 9, wherein the matching bearing element has a hook-shaped protrusion.

11. The tool system of claim 1, wherein the interface element has a slidable tube with an inner diameter larger than an outer diameter of the holdout tube.

12. The tool system of claim 11, wherein the slidable tube has a first end face in abutting contact with an end face of the elastic sleeve and a second end face in contact with the load regions of the actuation lever.

13. The tool system of claim 12, wherein the slidable tube has a ring-shaped force distribution flange on at least one of the first end face and the second end face.

14. The tool system of claim 1, wherein the actuation lever is monolithically formed as a single-piece part.

15. A method for mounting an elastic sleeve, comprising:
providing a holdout tube supporting the elastic sleeve prior to and during mounting of the elastic sleeve, the holdout tube having a longitudinal axis;
positioning the elastic sleeve in an expanded state around the holdout tube;
mounting an interface element at least partly encompassing the holdout tube, the interface element is movable along the longitudinal axis;
engaging an actuation lever with the holdout tube at a fulcrum region of the actuation lever, the actuation lever has a pair of load arms partly encompassing the holdout tube, a load region is arranged at a peripheral end of each of the load arms, the fulcrum region is located between the load regions and an effort region of the actuation lever; and
pivoting the actuation lever to actuate the interface element by pressing the load regions of the actuation lever against the interface element and moving the interface element along the longitudinal axis, the interface element transfers pressure onto the elastic sleeve to push the elastic sleeve off the holdout tube.

16. The method of claim 15, wherein each of the load regions engages the interface element at an equatorial position of the holdout tube.

17. The method of claim 15, wherein each of the load regions has a cam element with a curved outline keeping the actuation lever in contact with the interface element at a constant contact point during the pivoting of the actuation lever.

18. The method of claim 15, wherein the engaging step includes engaging a pin of the actuation lever with a matching opening in an outer circumference of the holdout tube, the pin extends in a direction along a lever axis of the actuation lever.

19. The method of claim 15, wherein the engaging step includes engaging a hook element of the actuation lever arranged in the fulcrum region with a matching recess in an outer circumference of the holdout tube.

20. The method of claim 15, wherein the engaging step includes engaging a pivot spindle of the actuation lever arranged in the fulcrum region with a matching bearing element in an outer circumference of the holdout tube.

21. The method of claim 15, wherein the engaging step is repeated at least once at another position after the interface element has been pushed a predetermined distance.

\* \* \* \* \*